United States Patent
Maruta et al.

(10) Patent No.: US 6,665,286 B1
(45) Date of Patent: *Dec. 16, 2003

(54) ADAPTIVE RECEIVING DEVICE REMOVING INTERFERENCE FROM USERS AND MULTI-PATHS BY ANTENNA DIRECTIVITY CONTROL

(75) Inventors: Yasushi Maruta, Tokyo (JP); Shousei Yoshida, Tokyo (JP); Akihisa Ushirokawa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,099

(22) Filed: Feb. 12, 1999

(30) Foreign Application Priority Data

Feb. 13, 1998 (JP) ............................................. 10-046334

(51) Int. Cl.$^7$ ................................................ H04B 7/216
(52) U.S. Cl. ...................... 370/342; 370/335; 455/25; 455/276.1
(58) Field of Search ............................. 370/335, 342; 342/380, 383; 375/144, 148, 347, 349; 455/562, 25, 272, 273, 276.1

(56) References Cited

U.S. PATENT DOCUMENTS

| | | | |
|---|---|---|---|
| 4,217,586 A | | 8/1980 | McGuffin |
| 4,575,724 A | * | 3/1986 | Wiener ........................ 342/380 |
| 5,028,931 A | * | 7/1991 | Ward ........................... 342/380 |
| 5,218,359 A | * | 6/1993 | Minamisono ............... 342/378 |
| 5,349,609 A | * | 9/1994 | Tsujimoto .................... 375/233 |
| 5,369,412 A | * | 11/1994 | Tsujimoto .................... 342/380 |
| 5,425,059 A | * | 6/1995 | Tsujimoto .................... 375/347 |
| 5,646,964 A | * | 7/1997 | Ushirokawa et al. ........ 370/342 |
| 5,745,858 A | * | 4/1998 | Sato et al. ................... 455/138 |
| 5,930,229 A | * | 7/1999 | Yoshida et al. .............. 370/203 |
| 5,940,742 A | * | 8/1999 | Dent .......................... 340/7.22 |
| 5,982,327 A | * | 11/1999 | Vook et al. .................. 342/378 |
| 5,999,826 A | * | 12/1999 | Whinnett .................... 455/562 |
| 6,061,553 A | * | 5/2000 | Matsuoka et al. .......... 455/273 |
| 6,081,516 A | * | 6/2000 | Yoshida et al. ............. 370/342 |
| 6,115,409 A | * | 9/2000 | Upadhyay et al. .......... 370/487 |
| 6,130,643 A | * | 10/2000 | Trippett et al. ............. 342/380 |
| 6,148,041 A | * | 11/2000 | Dent .......................... 375/340 |
| 6,188,915 B1 | * | 2/2001 | Martin et al. ............... 342/378 |
| 6,191,736 B1 | * | 2/2001 | Yukitomo et al. .......... 342/380 |
| 6,205,166 B1 | * | 3/2001 | Maruta et al. .............. 370/342 |
| 6,509,872 B2 | * | 1/2003 | Ishii et al. .................. 342/383 |

FOREIGN PATENT DOCUMENTS

EP        0 806 844 A1    11/1997

* cited by examiner

Primary Examiner—William Trost
Assistant Examiner—Marcos L. Torres
(74) Attorney, Agent, or Firm—Sughrue Mion, PLLC

(57) ABSTRACT

The adaptive receiving block $2k$ for the k-user generates a receiving signal by the k-th user the m-th path inherent antenna directivity pattern respectively, obtains the k-th user demodulation signal by demodulating and adding for each path simultaneously and outputs weight control error signal $e'_{k1} \sim e'_{kM}$ for the purpose of forming directivity pattern for each path. The weight control error synthesis circuit 3 optionally synthesizes weight control error signal $e'_{k1} \sim e'_{kM}$ and outputs synthesis weight control error signal $e'_{k1} \sim e'_{km}$. Synthesizing weight control error signals with respect to paths whose arrival directions of multi-path of each user are close, performing a control without synthesizing weight control errors with respect to paths whose arrival directions are apart, increasing the information available for adaptive control and enhancing an adaptive control characteristic and an interference suppression ability.

14 Claims, 8 Drawing Sheets

ADAPTIVE RECEIVING DEVICE REMOVING INTERFERENCE FROM USERS AND MULTI-PATHS BY ANTENNA DIRECTIVITY CONTROL

BACKGROUND OF THE INVENTION

The present invention relates to an adaptive receiving device removing interference from other users by an antenna directivity control, more particularly to an adaptive receiving device for a CDMA (Code Division Multiple Assess).

In such a cellular mobile communication system, interference from other users and interference by delay waves are the dominant factors which determine a receiving quality. Methods for removing these interference by employing adaptive antennas are considered. On the other hands, a CDMA method which can be expected for capacity acceptable for a large subscribership is noted as a wireless transmission method. A method utilizing a spread process gain is proposed as a receiving device employing an adaptive antenna which is suitable for a CDMA method.

Conventionally, for this type of an adaptive receiving device for a CDMA, as indicated, for example, in Oh, Kohno and Imai: "An TDL adaptive array antenna using spread process gain for spectrum spread multi-dimension connections", Communication Engineering Theory, Vol.J75-BII No. 11, pp. 815–825, 1992, and in Tanaka, Miki and Sawahashi: "Characteristic of decision feedback-type coherent adaptive diversity in DS-CDMA", Communication Engineering Technical Report, RCS96-102, 1996-11, the effect of SINR improvement due to process gain in an adaptive control is obtained by utilizing weight control error signal taken after de-spreading upon an antenna weight controlling.

FIG. 7 is a block diagram showing an example of conventional CDMA adaptive receiving devices, and FIG. 8 is a block diagram showing an adaptive receiving sub-block $27m$ for the m-th path in an adaptive receiving device for a CDMA of FIG. 7. Here, an adaptive receiving device for a CDMA is represented in the case where the number of receiving antennas is N (N is an integer more than 1), the number of users is K (K is an integer more than 1), and the number of multi-path is M (M is an integer more than 1).

Each of receiving antenna $1_1$~$1_n$ made of N pieces receives solicitation wave signals and a plurality of interference wave signals which are code-multiplexed. Receiving antenna $1_1$~$1_n$ are arranged closely so that each receiving signal has the correlation with each other. The first adder 5 adds outputs of adaptive receiving sub-blocks $27_1$~$27_M$ for the first~the M-th path, and outputs the k-th user demodulation signal. The decision circuit 6 performs hard decision for the first adder 5, outputs the k-th user decision symbol.

The adaptive receiving sub-block for the m-th path is composed of the weighted synthesis circuit 7, the first delay circuit 10, the de-spreading circuit 11, the demodulation circuit 12, the third complex multiplier 15, the error detection circuit 16, the fourth complex multiplier 17, the second delay circuit 18, the third delay circuit 19 and the antenna weight control circuit 20.

The adaptive receiving sub-block $27m$ for the m-th path inputs antenna receiving signal 1~antenna signal N and the k-th user decision symbol which is an output outputted from the decision circuit 6.

The weighted synthesis circuit 7 is composed of the first 10 complex multiplier $8_1$~$8_N$ and the second adder 9. A signal received by the m-th path inherent antenna directivity pattern is generated by multiplying antenna receiving signal 1~antenna receiving signal N by antenna weight $W_{m1}$ antenna $W_{mN}$ and by adding them.

The first delay circuit 10 delays an output outputted from the weighted synthesis circuit 7 on the basis of path delay of an separately required solicitation wave signal corresponding to multi-path. The de-spreading circuit 11 computes the correlation between an output of the weighted synthesis circuit 7 and a spread code $C_k$ of the k-user. The modulation circuit 12 is composed of the transmission path estimate circuit 13 and the second complex multiplier 14. An output which is multiplied the de-spreading circuit 11 by a complex conjugate of transmission estimate output becomes an output of adaptive receiving sub-block $27m$ for the m-th path.

The third complex multiplier 15 multiplies the k user decision symbol by a transmission path estimate output. The error detection circuit 16 computes the difference between an output of the third complex multiplier 15 and an output of the de-spreading circuit 11, and detects detection errors. The fourth complex multiplier 17 multiplies a decision error by the k-user spread code $C_k$, and generates a weight control error signal. The delay circuit 18 delays weight control error signals on the basis of path delay of the foregoing separately required solicitation signal so as to cancel out the effect of the first delay circuit 10.

The third delay circuit 19 delays antenna receiving signal 1~antenna receiving signal N in accordance with the processing time of the weighted synthesis 7, the de-spreading circuit 11, the demodulation circuit 12, the error detection circuit 16 and the like. The antenna weight control circuit 20 computes antenna weight $W_{m1}$~$W_{mN}$ from a weight control error signal which is an output of the second delay circuit 18 and an output of the delay circuit 19.

By assuming a spread code $C_k$ as a complex code composed of a code of $C_{kI}$ and a code of $C_{kQ}$ which are in an orthogonal relationship of the two (2) affiliations, the de-spreading circuit 11 can be realized by one-piece of complex multiplier and an averaging circuit over a symbol interval. Moreover, the de-spreading circuit 11 can be also realized by a transversal filter component in the case of assuming $C_k$ as a tap weight.

In receiving signals from receiving antenna $1_1$~$_N$ of N pieces, a solicitation wave signal component, an interference wave signal component and thermal noise are included. Moreover, multi-path component exists in a solicitation wave signal component and in an interference wave signal component respectively. Conventionally, those signal components arrive from different directions.

A conventional adaptive receiving device for a CDMA shown in FIGS. 7 and 8, prepares adaptive receiving sub-block $27_1$~$27_M$ for the first~the M-th path independently with respect to multi-path components and performs weighted synthesis of a receiving signal in each weighted synthesis circuit 7 so as to make solicitation wave signal-to-interference wave signal power rate (SIR) of signal components of each path to be the maximum value. As a result, as for antenna gain with respect to the arrival directions (directivity pattern) of adaptive receiving sub-block $27_1$~$27_M$ for the first~the M-th path, it is formed so that it becomes larger with respect to the respective arrival directions of path signal components and becomes smaller with respect to other delay wave signal components and interference wave signal components In order to improve the deterioration of adaptive control characteristic of a conventional adaptive receiving device for a CDMA shown in FIGS. 7 and 8 in the case where the number of paths are large, the authors previously proposed an adaptive receiving device for a CDMA adding weight control error of all paths for each user (Japanese Patent Application No. H9-210336). This adaptive receiving device for a CDMA prepares a weighted synthesis circuit with respect to each user, and performs weighted synthesis of antenna weight and antenna receiving signal so as to make synthesis weight control error signal adding weight control error signal of all paths for each user to be the minimum value. As a result, one directivity pattern for each user is formed, antenna gain becomes larger with respect to the arrival directions of signal components of each path, and it becomes smaller with respect to the interference components. Since this method adds weight control error signals of all paths for each user, information of adaptive control becomes increasing, and its adaptive control characteristic is excellent even in the case where the number of paths is large.

Since a conventional adaptive receiving device for a CDMA shown in FIGS. 7 and 8 uses error signal independently in a unit of each path and forms independent directivity pattern, in the case of error signal of path of smaller power, the reliability is lowered by transmission path estimate error. Therefore, in the case where the number of paths is large, the adaptive control characteristic is deteriorated, particularly, it becomes the problem that the directivity pattern of path when it is smaller power is difficult to be formed.

As means for solving the problem, an adaptive receiving device for a CDMA adding weight control error of all paths for the above described each user is proposed, but when multi-path component of solicitation wave signal arrival angle difference is incorporated simultaneously, since the width of beam is broadened and excessive interference is also incorporated, interference suppression ability is deteriorated in the case where the arrival angle difference of multi-path is large.

Moreover, since a conventional adaptive receiving device for a CDMA forms different directivity pattern for each user, it is the problem that it is difficult to perform multi-user receiving which receives a plurality of signals of users as a unit.

SUMMARY OF THE INVENTION

An objective of the present invention is to provide an adaptive receiving device whose adaptive control characteristic and interference suppressive ability are excellent under circumstances where a large number of paths arrive from various angles.

The adaptive receiving device of the present invention forms a pattern simultaneously incorporating paths of given combinations from all multi-path of all users as a directivity pattern receiving each path of each user.

More particularly, the adaptive receiving device of the present invention comprises an adaptive receiving block for the first~the K-th user ($2_1$~$2_K$ of FIG. 1), an adaptive receiving sub-block for the first~the M-th path for each user ($4_1$~$4_M$ of FIG. 2), and one weight control error synthesis means (3 of FIG. 1).

In the present invention, weight control error signal is synthesized with respect to paths whose arrival directions are close each other, and performs a control without weight control error difference with respect to paths whose arrival directions are apart. Through these performances, the volume of information available for adaptive control can be increased, and excellent adaptive control characteristic and interference suppression ability are obtained. Moreover, by performing a control of synthesizing weight control error signals of a plurality of multi-user, a multi-user receiving can be easily realized.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
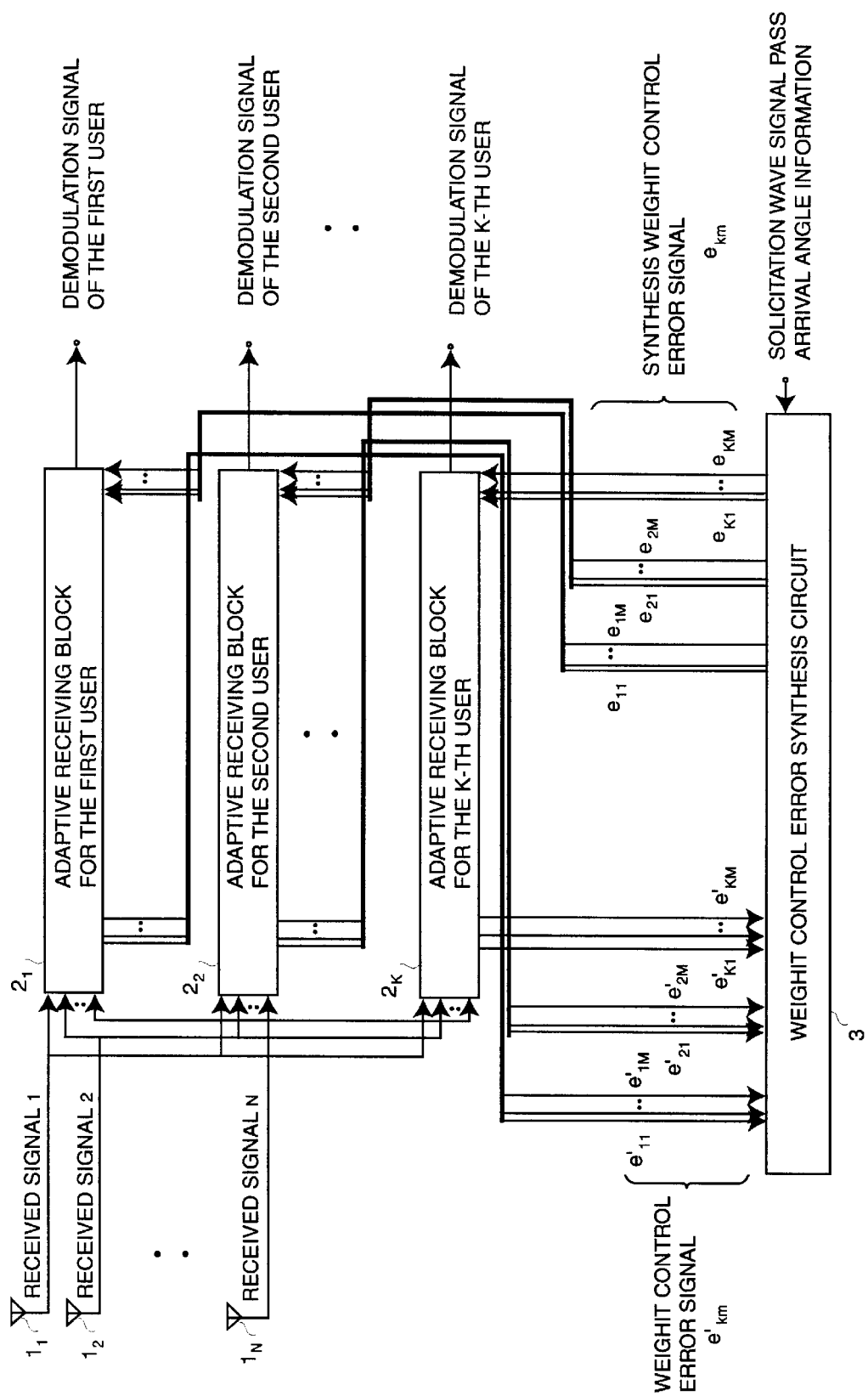
FIG. 1 is a block diagram showing the embodiment of an adaptive receiving device according to the present invention.

FIG. 1 is a block showing the embodiment of an adaptive receiving device according to the present invention. In FIG. 1, that signals multiplexed are code division multiplex signals, and an adaptive receiving device (adaptive receiving device for a CDMA) which is provided for N (N is an integer of more than 1) of the number of receiving antenna, K (K is an integer of more than 1) of the number of users and M (M is a integer of more than 1) of the number of multi-path, are shown.

Referring to FIG. 1, an adaptive receiving device is composed of receiving antenna $1_1$~$1_N$, adaptive receiving block $2_1$~$2_K$ for the first~the K-th user and the weight control error synthesis circuit 3. N pieces of receiving antenna $1_1$~$1_N$ receive solicitation wave signals and a plurality of interference wave signals which are code-multiplexed respectively. Receiving antenna $1_1$18 $1_N$ are arranged being nearby each other so that each receiving signal has the correlation relation with each other.

Figure 2:
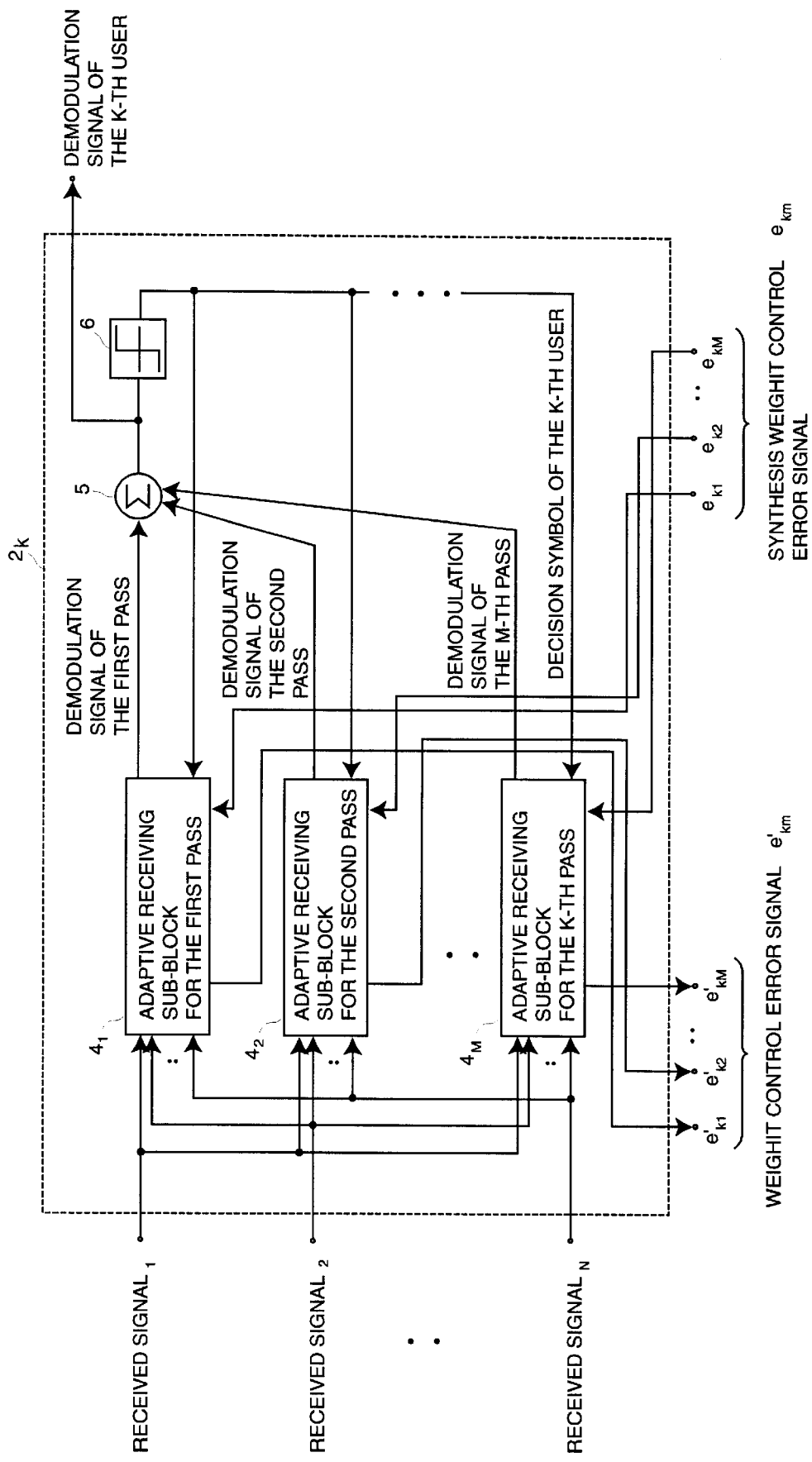
FIG. 2 is a block diagram showing the k-th user adaptive receiving block of an adaptive receiving device according to the present invention.

FIG. 2 is a block diagram showing adaptive receiving block 2k for the k-th user. Each of k pieces of adaptive receiving block $2_1$~$2_K$ for the firsts the K-th user as shown in FIG. 2, is composed of adaptive receiving sub-block $4_1$~$4_M$ for the first~the M-th path, the first adder 5 and the decision circuit 6.

The first adder 5 of adaptive receiving block 2k for the k-th user adds outputs of adaptive receiving sub-block $4_1$~$4_M$, and outputs the k-th user demodulation signal. The decision circuit 6 performs harden decision for an output of the first adder 5, and outputs the k-th user decision symbol.

Figure 3:
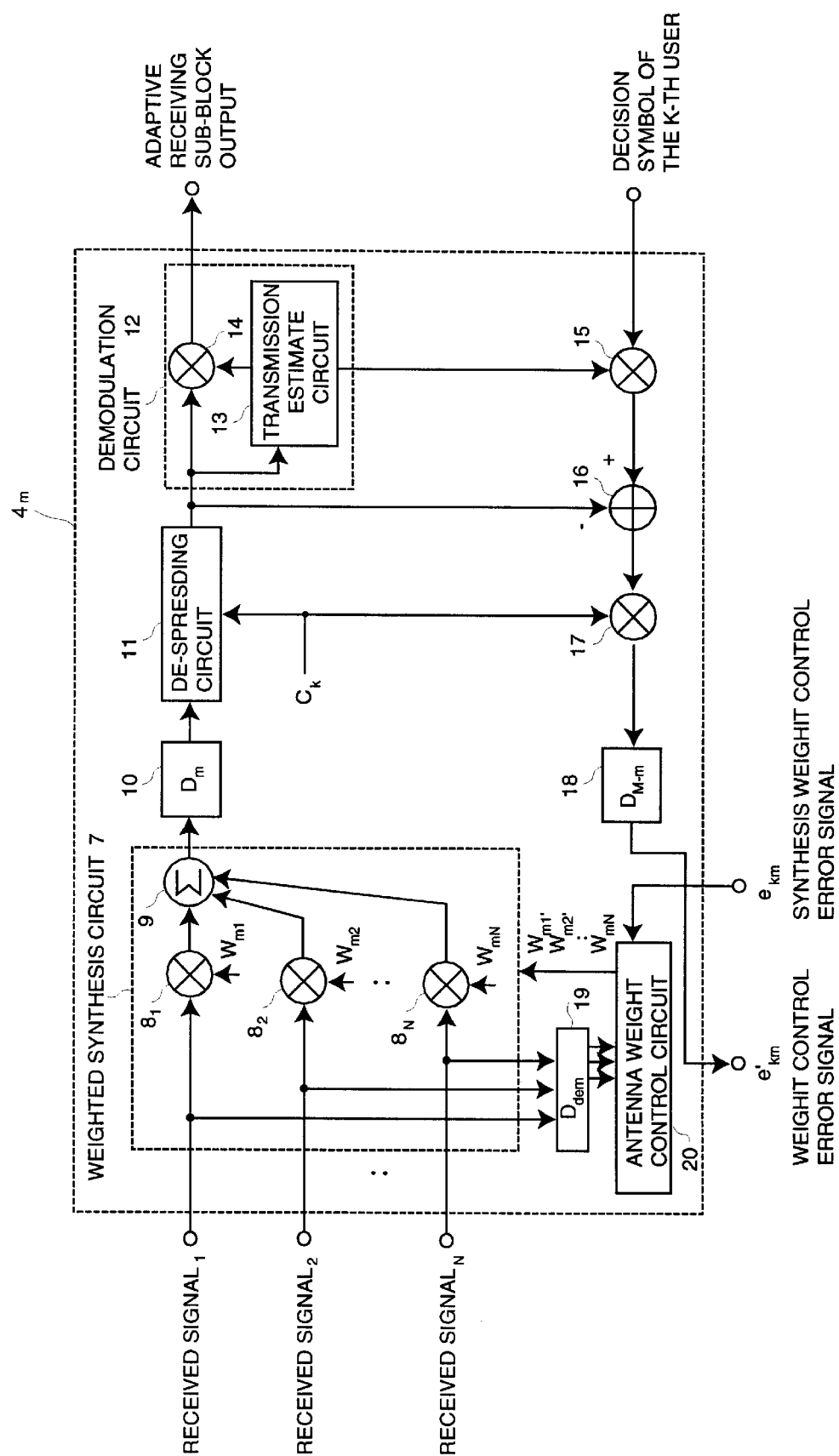
FIG. 3 is a block diagram showing the m-th path adaptive receiving sub-block of an adaptive receiving device for a CDMA according to the present invention.

FIG. 3 is a block diagram showing adaptive receiving sub-block 4m for the m-th path of adaptive receiving block $2k$ for the k-th user according to the present invention. Each of adaptive receiving sub-block $4_1$~$4_M$ for the first~the M-th path as shown in FIG. 3, is composed of the weighted synthesis circuit 7, the first delay circuit 10, the de-spreading circuit 11, the demodulation circuit 12, the third complex multiplier 15, the error detection circuit 16, the fourth complex multiplier 17, the second delay circuit 18, the third delay circuit 19 and the antenna weight control circuit 20. Adaptive receiving sub-block $4m$ for the m-th path for the sake of the k-th user inputs antenna receiving signal 1~antenna receiving signal N, the k-th user decision symbol and synthesis weight control error signal $e_{K1}$~$e_{kM}$.

The weighted synthesis circuit 7 is composed of the first complex multiplier $8_1$18 $8_N$ and the second adder 9, by multiplying antenna receiving signal 1~antenna receiving signal N by antenna weight $W_{m1}$~$W_{mN}$ and by adding them, a signal received by the m-th path inherent antenna directivity pattern is generated. The first delay circuit 10 based on path delay of solicitation wave signal which separately required an output of the weighted synthesis circuit 7, performs delaying in accordance with multi-path.

The de-spreading circuit 11 performs the correlation calculation between an output of the first delay circuit 10 and a spread code Ck of the k-user. Assuming that a spread code $C_k$ is a complex code composed of a code $C_{kI}$ and $C_{kQ}$ which are in an orthogonal relationship of the two (2) affiliations, the de-spreading circuit 11 can be realized with one complex multiplier and the averaging circuit over a symbol interval. Moreover, the de-spreading circuit 11 can be also realized with transversal filter composition making $C_k$ a tap weight.

The demodulation circuit 12 is composed of the transmission estimate circuit 13 and the second complex multiplier 14, an output which is multiplied an output of the de-spreading circuit 11 by a complex conjugate of transmission path estimate output becomes an output of the adaptive receiving sub-block $4m$ for the m-th path.

The third complex multiplier 15 multiplies the k-th user decision symbol and a transmission path estimate output outputted from the transmission path estimate circuit 13 together. It should be noted that as a transmission path estimate output which is complex-multiplied by decision symbol in the complex multiplier 15, only component concerning with phase outputted from the transmission path estimate circuit 13 is multiplied, and as for an amplitude, an amplitude which is required by other separate means, for example, an amplitude which is obtained in a functional block searching for a level and a timing of multi-pass of receiving signal can be also multiplied. The error detection circuit 16 computes a difference between an output of the third complex multiplier 15 and an output of the de-spreading circuit 11, and detects decision errors.

The fourth complex multiplier 17 multiplies a decision error by a spread code $C_k$ of the k-th user.

The second delay circuit 18 performs delaying on the basis of path delay of the foregoing solicitation wave signal required separately so that the effect of the first delay circuit 10 is cancelled out by an output of the fourth complex multiplier 17, and outputs a weight control error signal. The third delay circuit 19 delays antenna receiving signal 1~antenna receiving signal N in accordance with the processing time of the weighted synthesis circuit 7, the de-spreading circuit 11, the demodulation circuit 12 and the like.

The antenna weight control circuit 20 inputs an output of synthesis weight control error signal $e_{km}$ and an output of the third delay circuit 19, and computes antenna weight $W_{m1}$~$W_{mN}$. Here, antenna weight $W_{m1}$~$W_{mN}$ are adaptively controlled by the MMSE standard so that the square-average value of $e_{km}$ becomes the minimum value. In the case where LMS algorithm is employed as an update algorithm for a small amount of calculation, antenna weight $W_{m1}$~$W_{mN}$ are expressed by, $$W_m(i+1)=W_m(i)+\mu r(1-D_{dem})e_{km}*(i) \quad (1)$$

where $W_m(i)$ (column vector having factors of N pieces) is antenna weight of the i-chip-th in the m-th path, r(i) (column vector having factors of N pieces) is antenna receiving signal, $\mu$ is step size, $D_{dem}$ is a delay time given by the third delay circuit 19. Besides these, * represents a complex conjugate.

Expression (1) shows that the updating of antenna weight $W_{m1}$~$W_{mN}$ is performed in a chip period. Since the detection of decision error of each pass is performed by every symbol, by the product of integrating $r(i-D_{dem})$ and $e_{km}*(i)$ by one-symbol fraction, an update can be reduced by every symbol. Moreover, a step size $\mu$ which is a coefficient of varying amount when antenna weight $W_{m1}$~$W_{mN}$ are updated is characterized in that in the case where its value is large, although the convergence to antenna weight $W_{m1}W_{mN}$ for the purpose of the optimal directivity pattern formation is accelerated, but the accuracy and the stability of the adaptation are deteriorated, and on the other hand, in the case where its value is small, although the accuracy and the stability of the adaptation are good, but the convergence is delayed. That sufficient convergence rate, the accuracy and the stability of the adaptation are obtained by varying step size adaptively is also included in the present invention. Moreover, in the convergence process, the known symbol previously sent from the transmitting side also can be used in stead of the decision symbol.

Figure 4:
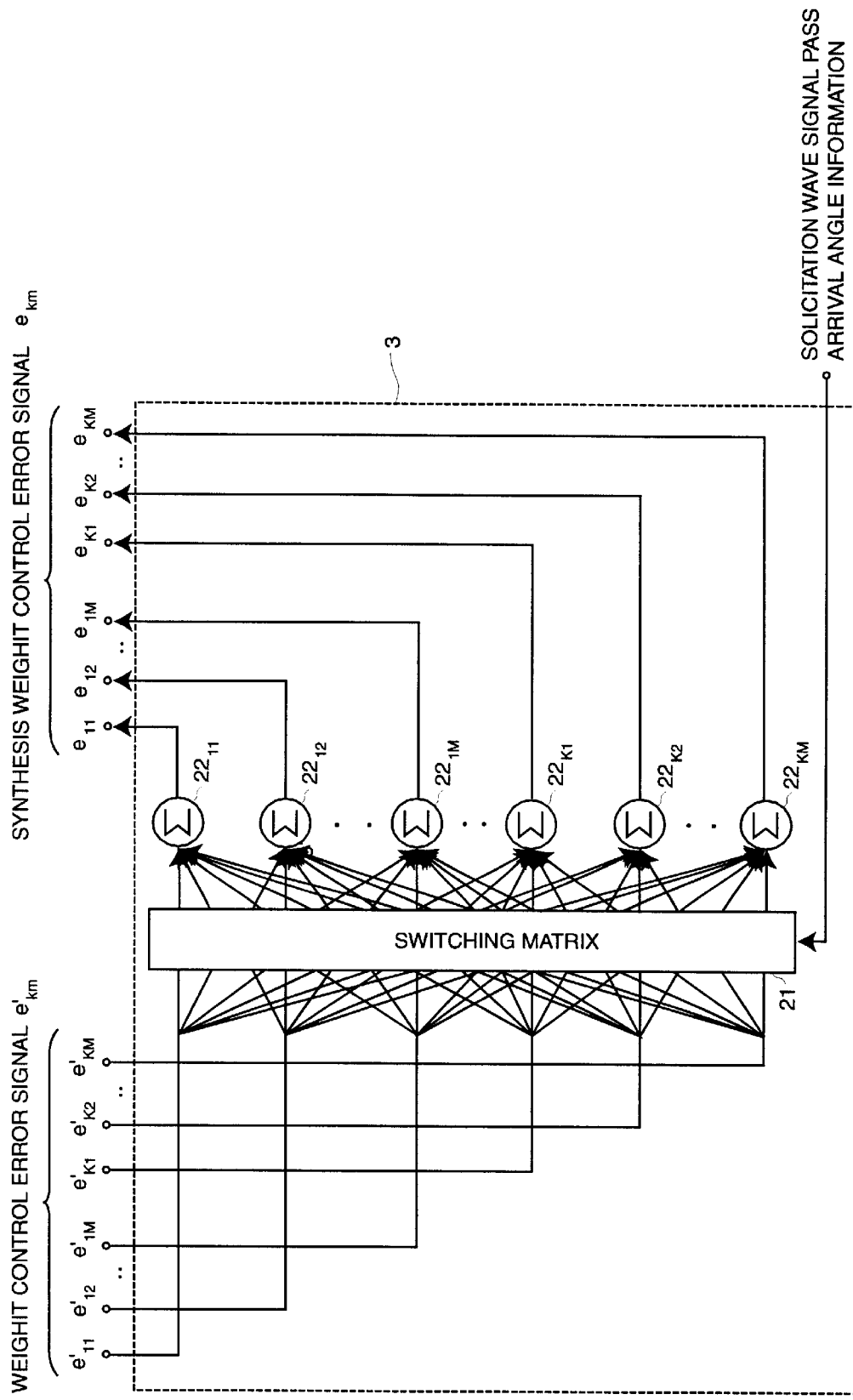
FIG. 4 is a block diagram showing a general form of weight control error synthesis circuit of an adaptive receiving device for a CDMA according to the present invention.

FIG. 4 is a block diagram showing a general form of the weight control error synthesis circuit 3. Referring to FIG. 4, the weight control error synthesis circuit 3 is composed of the first switching matrix 21 and the third adder $22_{11}$~$22_{KM}$. The first switching matrix 21 receives weight control error $e'_{11}$~$e'_{KM}$ of each path of all users and solicitation wave signal path arrival angle information of all users separately required as inputs, and outputs given combinations of weight control error $e'_{11}$~$e'_{KM}$ on the basis of this solicitation wave signal pass arrival angle information. The third adder $22_{11}$~$22_{KM}$ adds outputs of the first switching matrix 21 and generates synthesis weight control error $e_{11}$~$e_{KM}$.

FIG. 4 shows a general form of the weight control error synthesis circuit 3, synthesis of weight control error signal can be synthesized by given combinations selected from all paths of all users. In the present invention, methods of synthesizing weight control error are not limited, naturally, it is necessary to determine the manner of synthesis on the basis of a certain standard.

Figure 5:
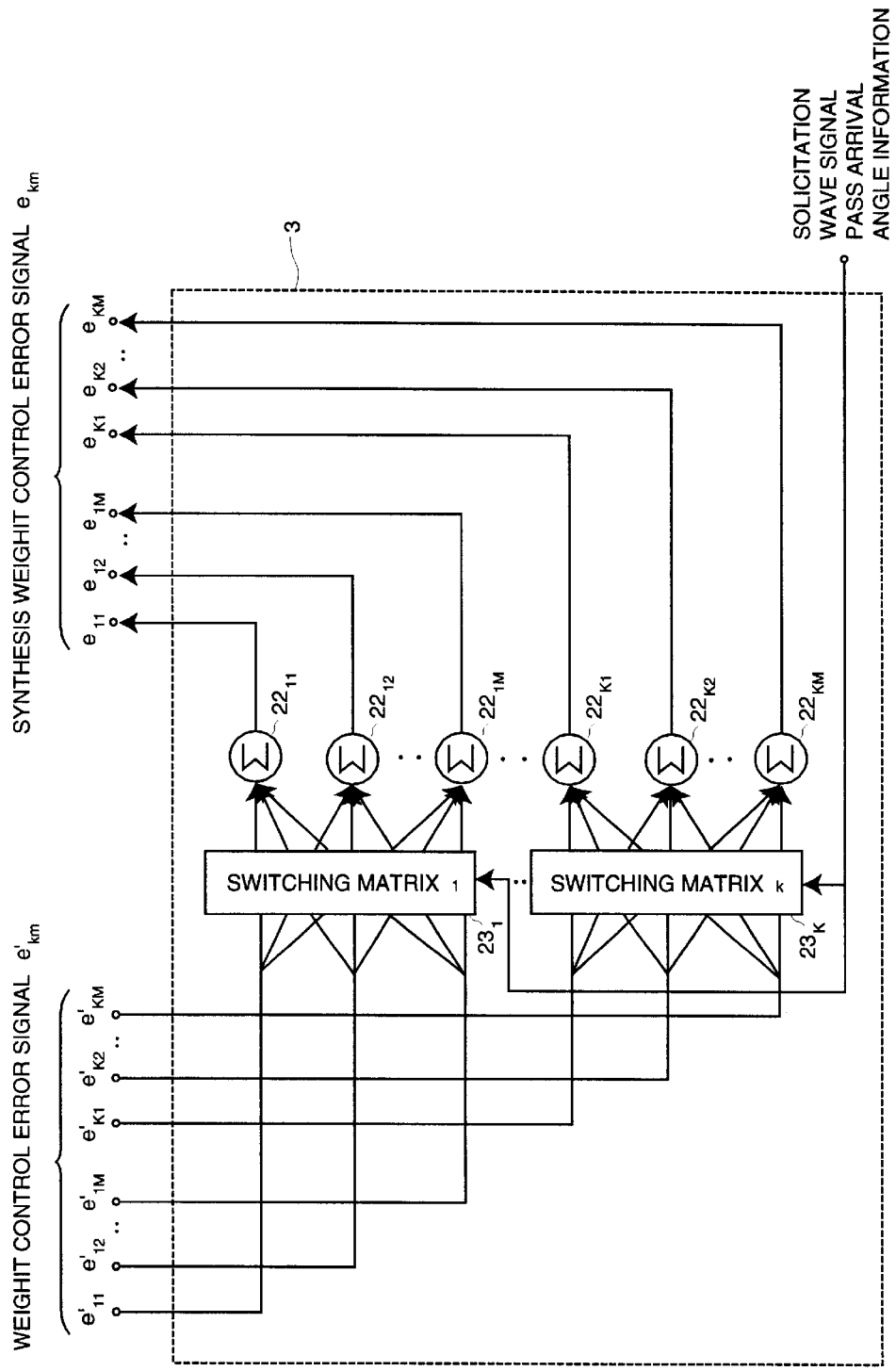
FIG. 5 is a block diagram showing the other example of weight control error synthesis circuit of an adaptive receiving device for a CDMA according to the present invention.

FIG. 5 is a block diagram showing another example of the weight control error synthesis circuit 3. The weight control error synthesis circuit 3 of FIG. 5 is composed of the second switching matrix $23_1$$23_K$ and the third adder $22_{11}$~$22_{KM}$. The second switching matrix $23_1$~$23_K$ outputs given combinations utilizing only weight control error of M pieces of each user. The third adder $22_{11}$~$22_{KM}$ adds outputs of the second switching matrix $23_1$~$23_K$ and generates synthesis weight control error $e_{11}$~$e_{KM}$.

In the weight control error synthesis circuit 3 of FIG. 5, by optionally synthesizing weight control error for each user independently, for example, close arrival waves in a unit can be received by one directivity pattern. The information of adaptive control is increased approximately by several-fold of the number of paths synthesized, and the characteristics of the convergence and the follow-up are excellent.

Figure 6:
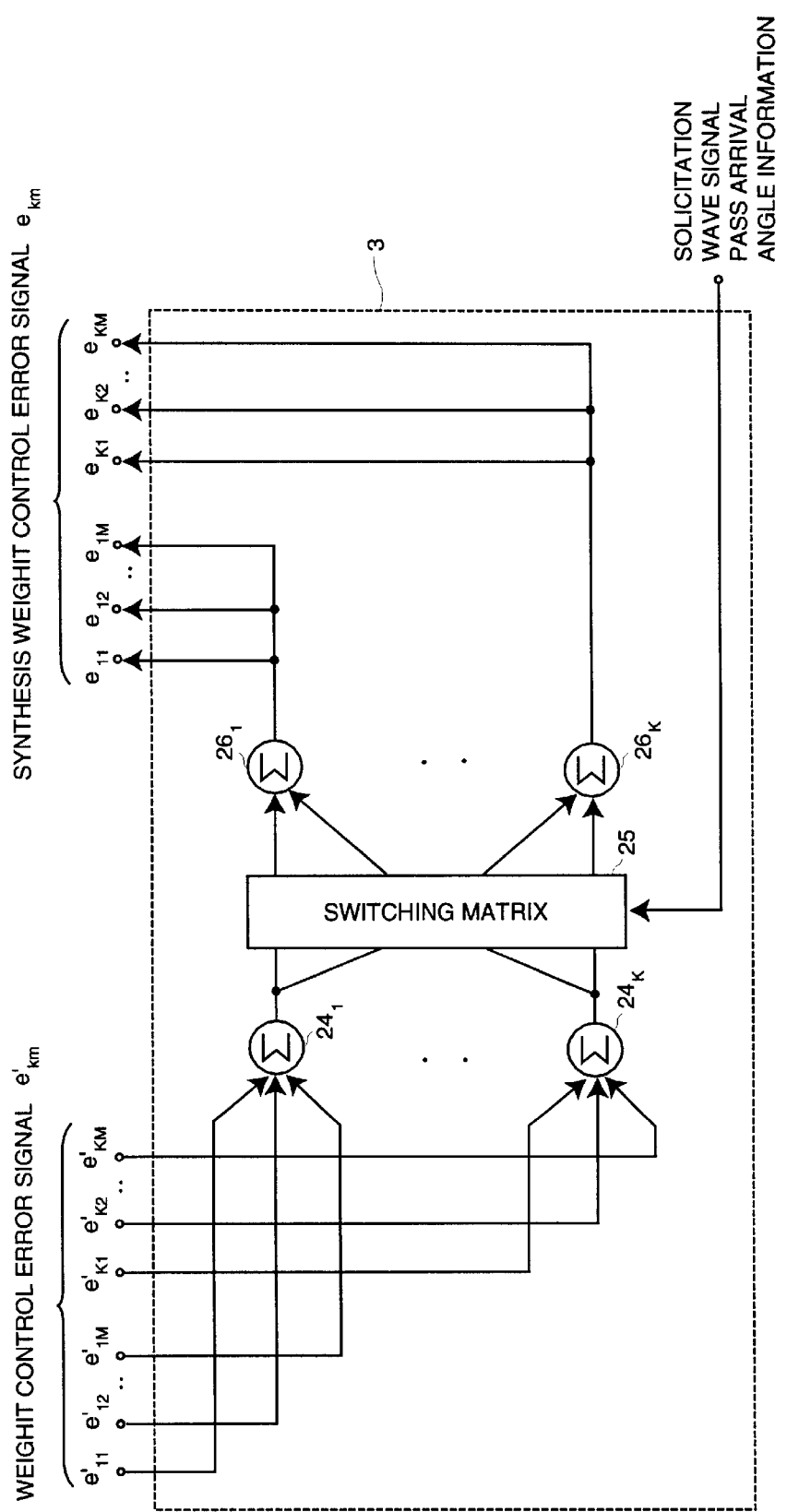
FIG. 6 is a block diagram showing the other example of weight control error synthesis circuit of an adaptive receiving device for a CDMA according to the present invention.
Figure 7:
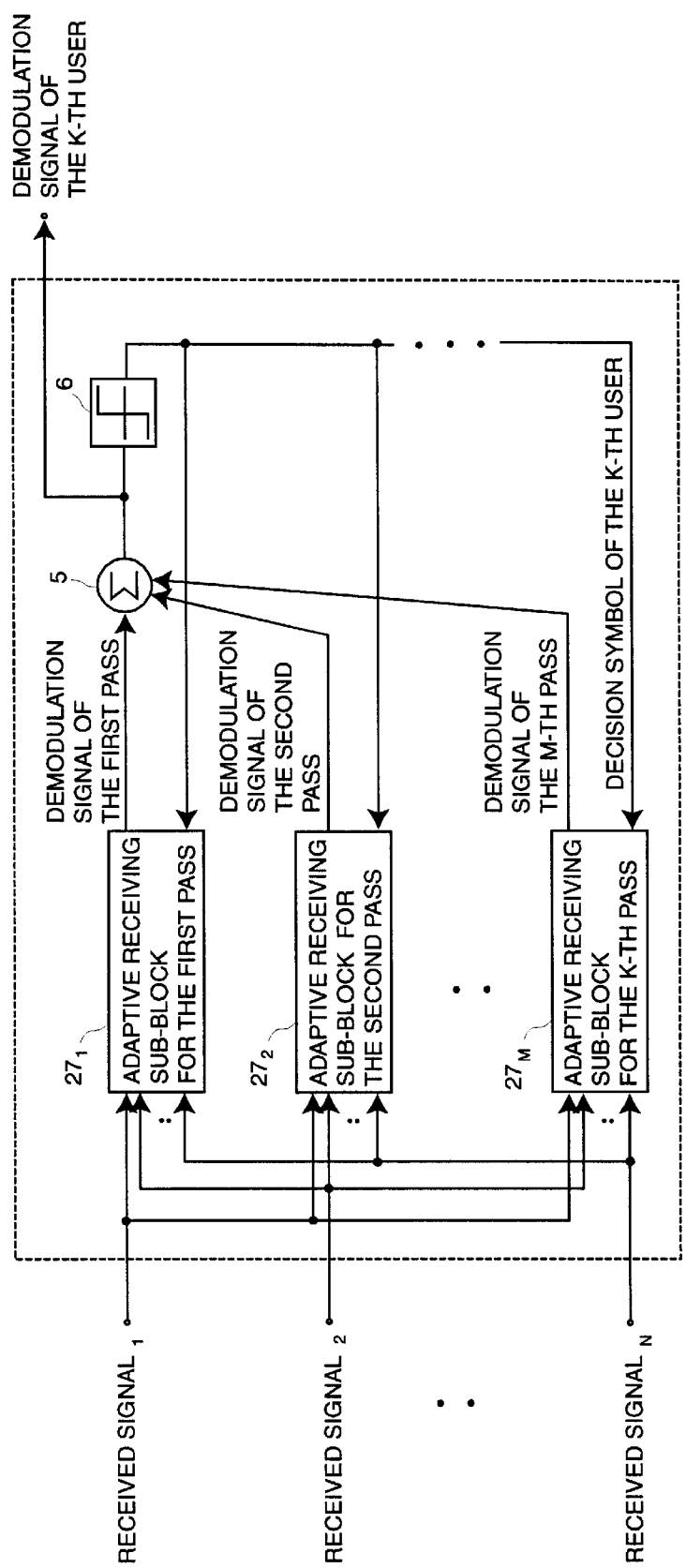
FIG. 7 is a block diagram showing an example of a conventional adaptive receiving device for a CDMA.
Figure 8:
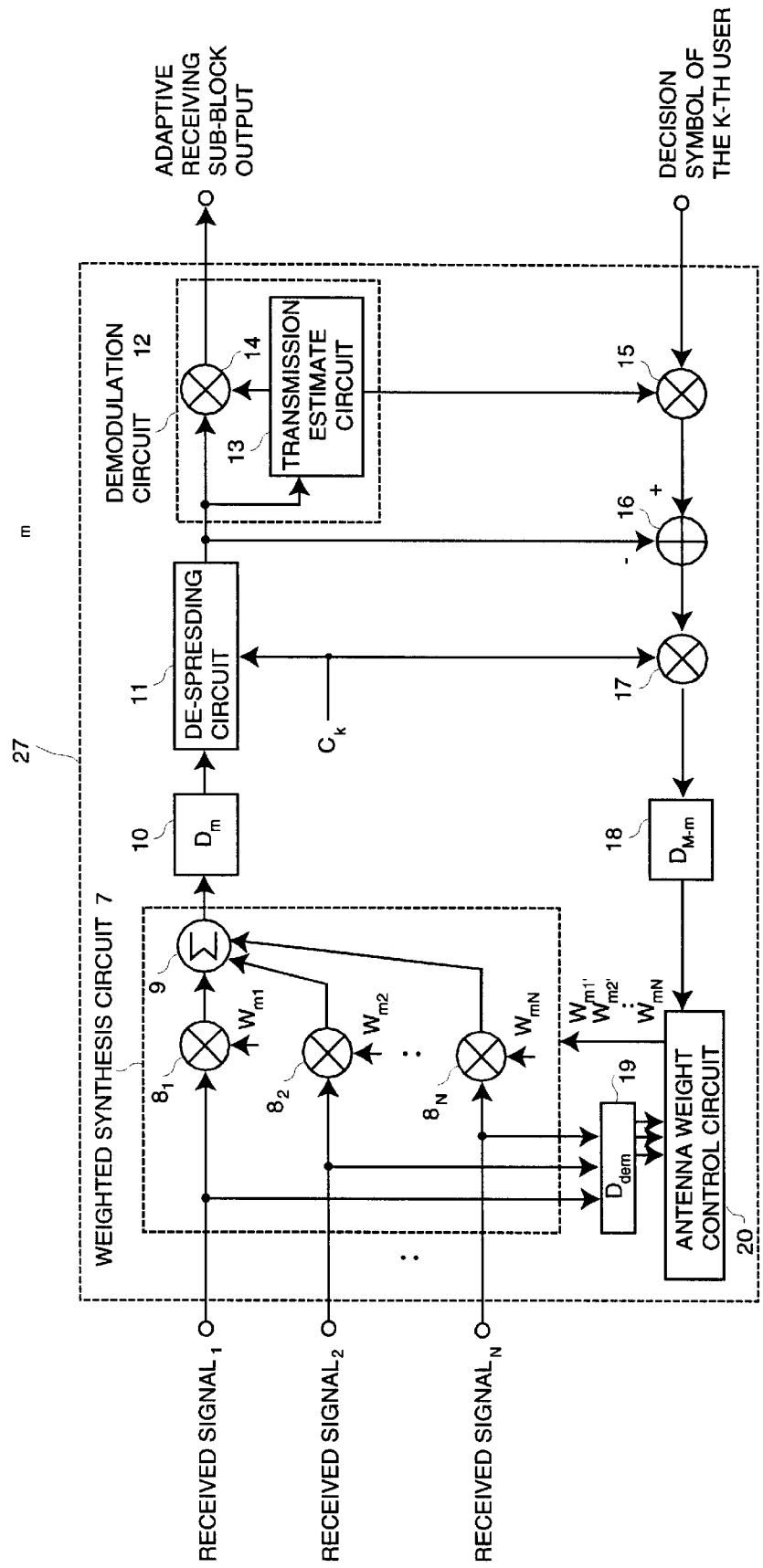
FIG. 8 is a block diagram showing the m-th path adaptive receiving sub-block of a conventional adaptive receiving device for a CDMA.

FIG. 6 is a block diagram showing further the other example of the weight control error synthesis circuit 3. The weight control error synthesis circuit 3 of FIG. 6 is composed of the fourth adder $24_1 \sim 24_K$, the third switching matrix 25 and the fifth adder $26_1 \sim 26_K$. The fourth adder $24_1 \sim 24_K$ adds weight control errors of M pieces for each user. The third switching matrix 25 outputs given combinations utilizing weight control errors of K pieces which are outputs of the fourth adder $24_1 \sim 24_K$. The fifth adder $26_1 \sim 26_K$ adds outputs of the third switching matrix 25 and generates synthesis weight control error $e_{11} \sim e_{KM}$.

In the weight control error synthesis circuit 3 of FIG. 6, at first, for each user, after one synthesis weight control error is made, since directivity pattern (multi-user-beam) which receives signals of a plurality of users in a unit can be formed by performing synthesis of weight control errors of a plurality of users in the third switching matrix 25, if the weight control error synthesis circuit 3 could be employed, a multi-user receiving can be easily realized.

It should be noted that the weight control error synthesis circuit 3 can be considered in other compositions rather than in compositions shown in FIG. 5 and 6, but all is included in the weight control error synthesis circuit 3 of FIG. 4.

It is desirable that the processes of the present invention are performed digitally in a base band. For the sake of that, it is necessary to convert a receiving signal of each antenna from a wireless band frequency to a base band frequency and perform analogue/digital conversion of it. In FIG. 1 through FIG. 8, those functions are omitted.

Moreover, in the embodiment of the present invention, a code length of a spread code $C_k$, that is to say, spread rate is not limited. The adaptive receiving device according to the present invention is also applicable to signals which are multiplexed by other methods rather than by code division multiplex access (CDMA) method and whose spread rate is 1.

Furthermore, as for receiving antenna in the present invention, the number N, the manner of arrangement (circular arrangement, linear arrangement and the like) the interval of arrangement (½ of carrier wave and the like) or directivity characteristic in a single equipment of antenna (omni-antenna, selector antenna and the like) is not limited, and can be executed in appropriate embodiments. Furthermore, K of the number of users which are received simultaneously and M of the number of multi-pass of each user also can be set optionally.

According to the present invention, since information available for adaptive control is increased by synthesizing a weight control error signal with respect to paths whose arrival directions of multi-path of each user are close each other and performing a control without synthesizing weight control errors with respect to paths whose arrival directions are apart each other, adaptive control characteristic and interference suppression ability are excellent under circumstances where a large number of paths arrive from various angles.

Moreover, since the present invention performs a control synthesizing weight control error signals of a plurality of users, a multi-user receiving can be easily realized.

What is claimed is:

1. An adaptive receiving device comprising:
   N receiving antennas (N is an integer greater than 1) receiving a plurality of signals of users, said signals being multiplexed;
   K adaptive receiving blocks corresponding to K users (K is an integer greater than 1) forming a directivity pattern having a gain for given directions with respect to receiving signals of said receiving antennas, receiving a solicitation wave signal composed of a plurality of paths and suppressing interference wave signals; and
   weight control error synthesis means synthesizing a plurality of weight control errors by combinations of given users and paths and generating synthesis weight control error signals,
   wherein said adaptive receiving blocks form said directivity pattern based on said synthesis weight control error signal.

2. An adaptive receiving device of claim 1, each of said K adaptive receiving blocks comprising:
   M adaptive receiving sub-blocks receiving received signals from said N receiving antennas and said synthesis weight control error signals as inputs, forming a directivity pattern having a gain for given directions with respect to M multi-paths (M is an integer of more than 1), suppressing interference wave signals, receiving solicitation wave signals and demodulating said solicitation wave signals;
   adders adding demodulating signals of said M adaptive receiving sub-blocks; and
   decision means for deciding said output of said adders and outputting decision symbols.

3. An adaptive receiving device of claim 2, wherein said multiplexed signals are code division multiplex signals, and each of said M adaptive receiving sub-blocks receives receiving signals from said N receiving antennas, said decision symbols and said synthesis weight control error signals as inputs,
   said each of said M adaptive receiving sub-blocks comprising:
   weighted synthesis means for forming a directivity pattern of received signals from said N receiving antennas;
   delay means for delaying an output of said weighted synthesis means for each of said M multi-paths based on a path delay of the solicitation wave signal;
   de-spreading means for de-spreading an output of said delay means utilizing a spread code of said solicitation wave signal;
   demodulation means for estimating a transmission path estimate of output of said de-spreading means;
   a multiplier for multiplying said decision symbol and complex transmission path estimate value which is an output of said demodulation means and canceling out a phase change made by carrier wave phase synchronization;
   error detection means for taking each output of said de-spreading means from an output of said multiplier and detecting determination errors;
   a multiplier for multiplying said determination error by a spread code of said solicitation wave signal and generating a weight control error signal;
   delay means for delay-supplementing said weight control error signal so as to cancel out an effect of said delay means;
   delay means for assigning delays corresponding to processing time in said weighted synthesis means, said de-spreading means, said demodulation means and said weight control error synthesis means to receiving signals from said N receiving antennas; and
   antenna weight control means for calculating N antenna weights based on said N delayed receiving signals and said synthesis weight control error signal and outputting said antenna weight signal to said weighted synthesis means.

4. An adaptive receiving device of claim 1, wherein said weight control error synthesis means has a switching matrix receiving K×M weight control error signals which are outputs of said M adaptive receiving sub-blocks and path arrival angle information of K users as inputs, and outputting said synthesis weight control error signals synthesized by given combinations of more than one of said weight control error signals.

5. An adaptive receiving device of claim 1, wherein said weight control error synthesis means comprises a switching matrix which is controlled so as to receive K×M weight control error signals which are outputs of said M adaptive receiving sub-blocks and path arrival angle information of K users as inputs, synthesize all of said weight control error signals of each path of an identical user upon synthesizing said weight control error signal, output one synthesis weight control error signal per one user and form one directivity pattern per one user.

6. An adaptive receiving device of claim 1, wherein said weight control error synthesis means comprises a switching matrix which is controlled so as to receive K×M weight control error signals which are outputs of said M adaptive receiving sub-blocks and path arrival angle information of K users as inputs, and synthesize said weight control error signals only with respect to paths whose arrival directions of multi-path of each user are close to each other.

7. An adaptive receiving device of claim 1, wherein said weight control error synthesis means comprises a switching matrix which is controlled so as to receive K×M weight control error synthesis signals which are outputs of said M adaptive receiving sub-blocks and path arrival angle information of K users as inputs, synthesize all of said weight control error signals of each path of an identical user upon synthesizing said weight control error signals, and after synthesizing one weight control error signal per one user, further synthesize said weight control error signals of users whose arrival directions of multi-path are close to each other.

8. An adaptive receiving device of claim 1, wherein said weight control error synthesis means comprises a switching matrix which is controlled so as to receive K×M weight control error signals which are outputs of said M adaptive receiving sub-blocks and path arrival angle information of K users as inputs, and synthesize said weight control error signals of users whose arrival directions of multi-path are close to each other regardless of whether said arrival directions of said multi-path are of any identical user or not.

9. An adaptive receiving device of claim 3, wherein said weighted synthesis means receives receiving signals from said N receiving antennas and N antennas weight as inputs and comprise N complex multipliers multiplying said N receiving signals by said N antennas weight respectively and an adder synthesizing each output of said N complex multipliers.

10. An adaptive receiving device of claim 3, said demodulation means comprising:
   transmission path estimate means for receiving an output of said de-spreading means as an input and estimating an amplitude and a phase of a carrier wave;
   complex conjugate operation means for requiring complex conjugate of a complex transmission path estimate value which is an output of said transmission path estimate means; and
   multiplier for multiplying an output of said inverse spread means by an output of said complex conjugate operation means, performing carrier wave phase synchronization and simultaneously performing weighted operation for maximum rate combination.

11. An adaptive receiving device of claim 2, in said adaptive receiving sub-block of said adaptive receiving device, wherein a known symbol is used instead of a decision symbol in a convergence process.

12. An adaptive receiving device of claim 2, in said adaptive receiving sub-block of said adaptive receiving device, wherein when a decision symbol is multiplied by transmission path estimate values of each pass, a decision symbol is multiplied by only components concerning with phase of estimate value, and as for an amplitude, a determination signal is multiplied by an amplitude required through other separate means.

13. An adaptive receiving device of claim 3, in said antenna weight control means of said adaptive receiving device, wherein an adaptive control antenna weight is performed by least mean square error standard so that average power of a synthesis weight control error signal is the minimum value.

14. An adaptive receiving device of claim 3, in said antenna weight control means of said adaptive receiving device, wherein least mean square (LMS) algorithm is utilized upon performing an adaptive control of an antenna weight with least mean square error standard.

* * * * *

UNITED STATES PATENT AND TRADEMARK OFFICE
CERTIFICATE OF CORRECTION

PATENT NO. : 6,665,286 B1
DATED : December 16, 2003
INVENTOR(S) : Yasushi Maruta, Shousei Yoshida and Akihisa Ushirokawa It is certified that error appears in the above-identified patent and that said Letters Patent is hereby corrected as shown below:

Column 4,
Line 56, delete "firsts" and insert -- first --.

Column 5,
Line 14, delete "$8_1$ 18 $8_N$" and insert -- $8_1$~$8_N$ --;
Line 24, delete "Ck" and insert -- $C_k$ --;

Column 6,
Line 24, delete "$Wm_1 Wm_N$" and insert -- $Wm_1$~$Wm_N$ --;

Signed and Sealed this

Twenty-eighth Day of December, 2004

JON W. DUDAS
*Director of the United States Patent and Trademark Office*